(No Model.)

J. McMURTRY & P. CARROLL.
Seed Cleaner.

No. 230,143.          Patented July 20, 1880.

Witnesses:
W. W. Mortimer
Will. H. Kern

Inventors:
Jno. McMurtry
Patrick Carroll
by F. O. Lehmann, Atty.

UNITED STATES PATENT OFFICE.

JOHN McMURTRY AND PATRICK CARROLL, OF LEXINGTON, KENTUCKY.

SEED-CLEANER.

SPECIFICATION forming part of Letters Patent No. 230,143, dated July 20, 1880.

Application filed March 11, 1880. (No model.)

*To all whom it may concern:*

Be it known that we, JOHN MCMURTRY and PATRICK CARROLL, of Lexington, in the county of Fayette and State of Kentucky, have invented certain new and useful Improvements in Seed-Cleaners; and we do hereby declare the following to be a full, clear, and exact description of the invention, such as will enable others skilled in the art to which it pertains to make and use it, reference being had to the accompanying drawings, which form part of this specification.

Our invention relates to an improvement in seed-cleaners; and it consists in the combination of a cylinder having brushes applied to its circumference in a spiral form, a concave cover, also having brushes applied to its inner side in a concave form, and a curved sieve that is placed just under the cylinder and through which the seed are forced by the brushes.

Figure 1:
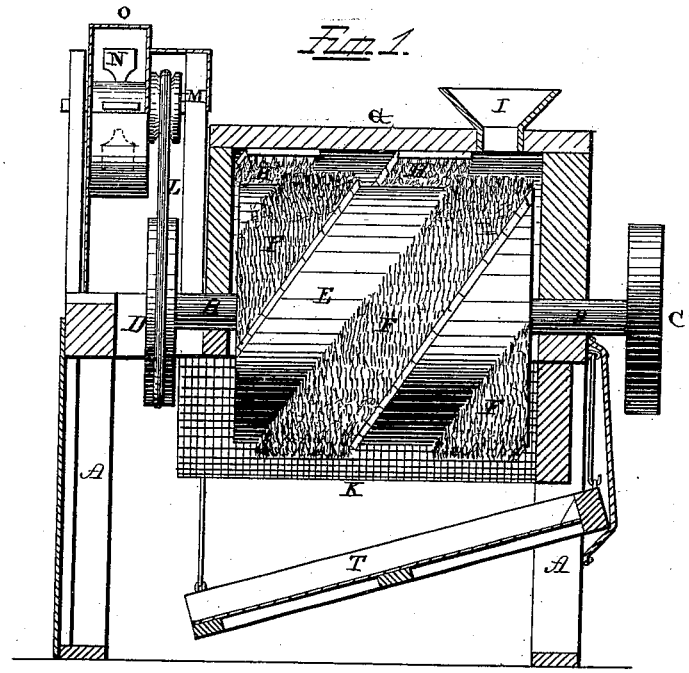
Figure 2:
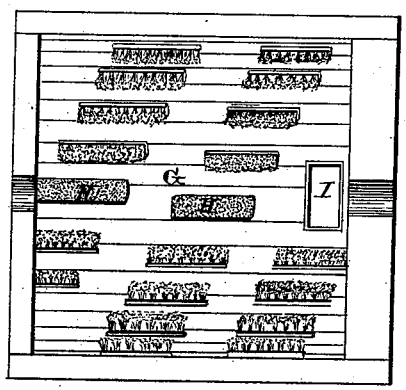
Figure 3:
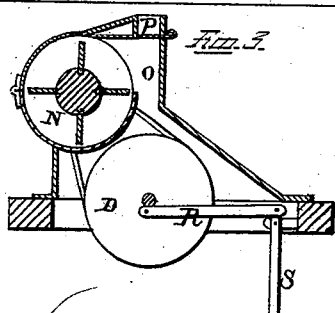

Figure 1 is a vertical section of my invention. Fig. 2 is a plan view of the inside of the cover. Fig. 3 is a detail view.

A represents a suitable frame-work, upon the top of which is journaled the shaft B, which has a driving-pulley, C, at its outer end, and another one, D, at its inner one. Upon this shaft is placed a suitable cylinder, E, around which the brushes F are arranged in a spiral form, as shown. Over the top of this cylinder is placed a concave covering, G, which has the brushes H applied to its inner side, also in a spiral form, so as to co-operate with the brushes placed on the shaft to separate the seed, which is poured in at the hopper I, from its hulls and chaff.

As the seed is poured in at the hopper the spiral form of the brushes at once draws it away from that end of the frame and moves it toward the opposite end, and in thus moving the seed along the brushes separates the seed from their hulls.

Just below the cylinder is the concave sieve K, the meshes of which are just sufficiently large to allow the brushes to force the seed down through them, but too small to allow the chaff and hulls to pass through with them. While the seed are forced through the concave screen the chaff and hulls are moved toward the rear end of the frame, where they drop from the end of the concave screen upon the inclined shaking-screen below.

Passing through the pulley D is a band or belt, L, which passes over a pulley, M, on the end of the shaft of the fan N. This fan, being operated by the shaft, forms a suction for the purpose of drawing the dust and chaff from among the seed and forcing them up through the flue O. This flue is provided with a suitable valve, P, which serves to regulate the draft in such a manner that only the chaff and dust will be acted upon by the fan, and not the seed. This dust and chaff can be conveyed away and discharged at any desired point. The fan is provided with a hinged cover, so as to give access to it at any time. In order to cause the suction of this fan to thus act on the grain as it is being cleaned, the sides of the frame A are covered with canvas or any suitable covering.

On the outer side of the pulley D is a wrist-pin, to which is fastened a connecting-rod, R. The other end of this rod R is fastened to a pivoted rod, S, and to the lower end of this rod is fastened an inclined shaking-screen, T, upon which the seed and those hulls and chaff that are forced through the concave screen fall. The meshes of this inclined shaking-screen are just large enough to allow the seed to pass through them, but too small to allow the passage of the chaff and hulls. As this screen is inclined, and is kept constantly shaking while the seed drops through on the floor beneath, the chaff and hulls run off of the rear end of the machine.

By the arrangement and combination of parts above described a seed-cleaner is formed which is very cheap and simple in its construction and very rapid in its operation, and which separates the hulls, chaff, and dust from the seed in a very thorough and rapid manner.

Having thus described our invention, we claim—

The combination of the cylinder provided with spirally-arranged brushes, the concave cover having brushes spirally arranged on its surface, and the concave screen placed just below the cylinder, substantially as set forth.

In testimony that we claim the foregoing we have hereunto set our hands this 26th day of February, 1880.

JOHN McMURTRY.
PATRICK CARROLL.

Witnesses:
S. L. CHEVIS,
L. ROYALTY.